Nov. 7, 1967     L. EVANTASH     3,351,258

ICE CREAM CONE HOLDER

Filed Oct. 19, 1966

INVENTOR.
LEON EVANTASH

BY *Maleson + Ratner*

ATTORNEY

United States Patent Office 3,351,258
Patented Nov. 7, 1967

3,351,258
ICE CREAM CONE HOLDER
Leon Evantash, 855 Kent Lane, Philadelphia, Pa. 19115
Filed Oct. 19, 1966, Ser. No. 587,712
1 Claim. (Cl. 229—1.5)

ABSTRACT OF THE DISCLOSURE

A rigid plastic non-edible ice cream cone holder. The holder has a major portion with inwardly projecting gripping edges, and an outwardly flared smooth drip ring, so arranged as to permit a minor portion of the cone to extend above the junction of the drip ring and major portion. The bottom is closed to catch ice cream that runs down between the gripping edges.

---

This invention relates to a holder for an ice cream cone. More particularly, it relates to a non-edible device for the support of an edible cone, usually of pastry, which in turn supports a ball or other quantity of ice cream.

It has been known to provide edible ice cream cones, cups, and other receptacles of many different types and varieties. It has been known to provide protective coatings and wrappings directly on edible cones. One expedient for providing a holder for a cone is shown in Patent 2,162,224. The present invention is an improvement over such known devices.

A major shortcoming of edible cones for ice cream is that they tend to permit melting ice cream to run over the outer surface of the cone, and onto the hands of the user, as well as onto clothes and other property. Some cones have been designed to inhibit this tendency by the provision of inner supporting structures of various kinds. However, when the consumer begins to eat the cone itself, this type of structure is disrupted and fails. It remains desirable however to provide an edible cone, since this is part of the over-all traditional character of this particular confection or food. The purpose of the present invention is to provide a relatively inexpensive and easy to use device that will support that edible cone and its contents in a manner to prevent leaking and dripping while at the same time permitting easy access to the cone and the ice cream by the consumer. This invention appears simple in its structure, but its very simplicity makes it possible that this long-felt need is met.

It is an object of this invention to provide a non-edible ice cream holder.

It is another object of this invention to provide a one-piece plastic holder to support an edible ice cream cone and the ice cream therein, including means to prevent dripping of the ice cream beyond the limits of the holder and means to support the cone so that it is easily accessible to the consumer.

Other aims and objects of this invention are made apparent in the following specification and claims.

The invention is best understood in connection with the accompanying drawings in which like numerals refer to like parts and in which.

Figures 1, 2, 3:
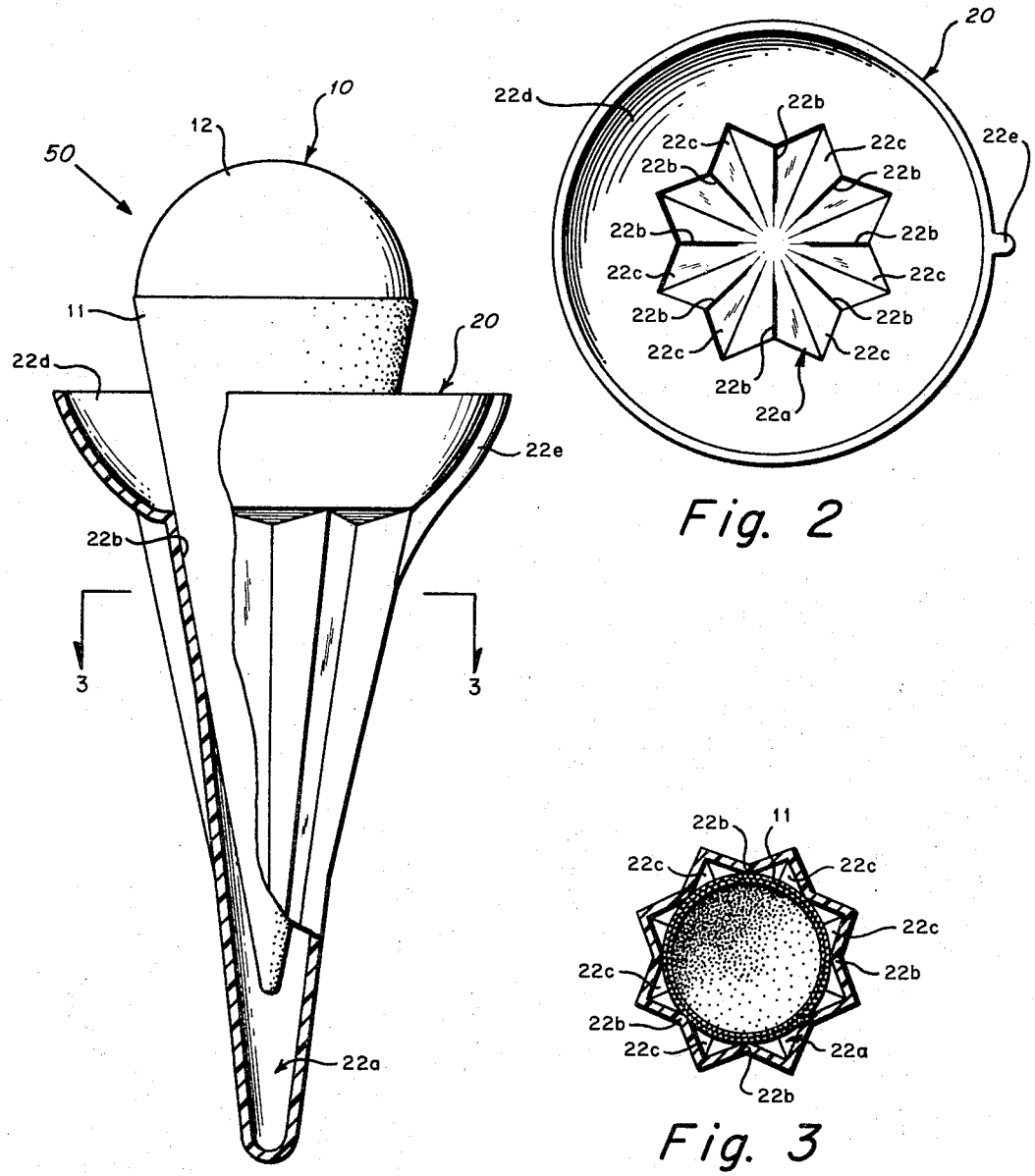
FIGURE 1 is an elevation view, partly fragmented and partly in cross-section, of the non-edible cone holder supporting an edible cone and ice cream.
FIGURE 2 is a plan view of the non-edible cone holder without the cone in it.
FIGURE 3 is a cross-sectional view taken along line 3—3 of FIGURE 1.

The combination of the cone holder, the cone, and the ice cream is generally designated 50. The edible portion, that is, the ice cream and the cone is generally designated 10. This edible portion comprises a ball or other mass of ice cream 12 and an edible ice cream cone 11. The cone 11 is of conventional shape and structure, generally being a geometrical cone; open at the large diameter at the top and tapering downwardly to a closed end. The cone 11 is made of any of the suitable known materials for such cones, generally baked pastry.

The non-edible cone holder, sometimes herein referred to as the holder is generally designated 20. The holder 20 is preferably made of a single piece of molded synthetic plastic. Plastics such as polyvinyl chloride, polyethylene and polypropylene are all suitable. The requirement is that in the thickness or gauge used, the plastic have enough structural rigidity and strength to support the cone and ice cream without the pressure of the hand of the user destroying it. The holder 20 may be intended to be reuseable, or to be a throw-away. The intended use will to some extent govern the nature and thickness of the material used in its construction. That is, a more rugged construction is used if the holder is intended to be reused. A thickness of one sixteenth of an inch of polyvinyl chloride is fully adequate. In all cases, the material of the holder is waterproof.

The holder 20 is itself generally conical in shape, with the open large diameter of the cone at the top, tapering to a reduced diameter closed bottom. The uppermost portion of the holder is a drip ring 22d. Drip ring 22d is circular in a horizontal plane, as best shown in FIGURE 2. As best shown in FIGURE 1, the maximum horizontal diameter is at the top, and the general configuration of drip ring 22d in a vertical plane is a departure from the general configuration of the major conical shape. The diameter of the drip ring at the top is substantially greater than would result from an extension of the sloping sides of the major portions of the holder upwardly. The drip ring slopes inwardly in a curve so that if continued, it would form a shallow saucer-like dish, but the drip ring 22d does not continue beyond its intersection with the major portion of the holder.

The major portion or major length of the holder, that is, the part thereof beginning at the bottom of the drip ring and extending to the bottom of the holder, may be best described as a conical shape having a star-like horizontal cross-section for most of its length. The generally conical portion of the holder is generally designated 22a.

The configuration of the major portion of conical portion 22a is best initially explained in connection with FIGURE 3. This figure illustrates the structure in a given horizontal plane. The holder's circumference comprises a plurality of mutually angled intersecting straight sections 22c. The innermost points of intersection in a given plane are designated 22b. In the embodiment shown in FIGURE 3, there are seventeen of these short straight sections, whose intersections define eight innermost points of intersection.

As best shown in FIGURES 1 and 2, each of these straight sections 22c extends downwardly along the length of the holder, and as the horizontal diameter of the holder decreases toward the bottom point, the individual width of each of the straight sections 22c decreases. The innermost line of intersection between any two adjacent sections 22c is an intersection line 22b. As shown in FIGURES 1 and 2, when these straight sections 22c with their intersection lines 22b have travelled down a major portion of the conical portion 22a of the holder 20, they give way to a conical structure of circular cross-section. That is, the faceted appearance of the conical portion 22a below drip ring 22d turns into a smooth circular appearance as the bottom is approached. The exact point of transition is not critical.

As shown in FIGURES 1 and 3, the edible ice cream cone 11 is supported in cone holder 20 by its contact with the innermost intersecting lines 22b. The plurality of these intersection lines 22b grip and center the ice cream cone 11. The fact that the contact between holder 20 and the cone 11 may at a number of points or lines rather than over a large uniform surface tends to provide a desirable gripping action so that the ice cream cone 11 is not easily able to be jarred loose or fall from the holder. Of course, this is due to the fact that the unit force exerted against the outer surface of the ice cream cone by the intersecting lines 22b is greater than would be the case if there were a large area of contact. The slight indentation or deformation of an ice cream cone tends to provide this gentle locking action.

It is desirable to have a relationship between the size of the ice cream cone 11 and the non-edible cone holder 20 so that the top of the ice cream cone 11 extends a substantial distance above the top of the holder. This permits the consumer to bite into the edible cone and it has been found easy for the consumer to eat the entire cone. The teeth of the consumer pull the bottom of the cone 11 out of the holder as required. The structural interrelationship between the edible cone 11 and the holder 12 may be described as follows. The locus of the circle passing through the points at which the intersection lines 22b intersect the drip ring 22d has a diameter equal to the outside diameter of the edible ice cream cone 11 at a point a substantial but minor distance along its length from the open end to the closed end. In a preferred embodiment, as shown in FIGURE 1, this distance is approximately one sixth of the distance from the open end of the ice cream cone to its closed end. This permits about three quarters of an inch of ice cream to extend above the top of the cone holder 20.

It is apparent that the exact amount of extension is not critical. It is very highly preferable that at least some portion of the ice cream cone extend above the level of the holder. The relationship of the sizes of the holder and the cone can be described as being such that less than half of the cone extends above the level of the holder, but at least enough extends above so that a consumer may grip it with his teeth.

The extension 22e shown in FIGURE 1 and 2 is a consequence of the molding method used in forming the particular cone illustrated, and this extension is not in itself essential to the invention.

It is apparent that drippings from the ice cream 12 fall into the drip ring 29 and thence drain through openings between the mutually angled intersecting street laterally tapering sections 22c, to fall into the bottom of the holder.

The scope of this invention is to be determined by the appended claims and not limited to the foregoing description and drawings which are illustrative.

I claim:

The combination of an edible ice cream cone and a non-edible ice cream cone holder, said ice cream cone being positioned within said holder and being gripping and supported thereby, said holder comprising a rigid molded synthetic plastic drip ring having a smooth inner and outer surface and a circular shape in a horizontal plane and, a smooth curvilinear shape in a vertical plane, and sloping inwardly and downwardly to join a major portion of said holder, said major portion being generally conical and comprising a plurality of downwardly extended mutually angled and intersecting straight sections, each tapering to a narrower width downwardly, said major portion terminating at the bottom end thereof in a closed narrow end, the intersections of said straight sections comprising longitudinal intersection lines, some of said lines being innermost intersection lines, said innermost intersection lines being so mutually spaced that said edible ice cream cone is supported thereon, the top of said edible ice cream cone being above the top of said drip ring with approximately one-sixth of said cone extending above said drip ring, but no more than one-half of the length of said ice cream cone being above said drip ring.

References Cited

UNITED STATES PATENTS

| | | | |
|---|---|---|---|
| 1,800,759 | 4/1931 | Shean | 229—1.5 |
| 2,948,452 | 8/1960 | Grogan et al. | 229—1.5 |
| 3,082,900 | 3/1963 | Goodman | 229—1.5 |

JOSEPH R. LECLAIR, *Primary Examiner.*

DAVID M. BOCKENEK, *Examiner.*